United States Patent
Jeung

(10) Patent No.: US 8,299,661 B2
(45) Date of Patent: Oct. 30, 2012

(54) ROTOR OF BRUSHLESS MOTOR

(75) Inventor: Young-Chun Jeung, Cypress, CA (US)

(73) Assignee: SNtech Inc., Phoenix, AZ (US)

( * ) Notice: Subject to any disclaimer, the term of this patent is extended or adjusted under 35 U.S.C. 154(b) by 83 days.

(21) Appl. No.: 12/192,059

(22) Filed: Aug. 14, 2008

(65) Prior Publication Data

US 2008/0315691 A1 Dec. 25, 2008

Related U.S. Application Data

(63) Continuation-in-part of application No. 11/896,454, filed on Aug. 31, 2007, now abandoned, and a continuation-in-part of application No. 12/102,539, filed on Apr. 14, 2008, now abandoned.

(30) Foreign Application Priority Data

May 11, 2007 (KR) .................. 10-2007-0045977
Oct. 25, 2007 (KR) .................. 10-2007-0107665

(51) Int. Cl.
H02K 5/24 (2006.01)
(52) U.S. Cl. ................. 310/51; 310/156.08; 310/156.12
(58) Field of Classification Search ............ 310/51, 310/156.08, 156.12
See application file for complete search history.

(56) References Cited

U.S. PATENT DOCUMENTS

| | | | |
|---|---|---|---|
| 2,192,985 A | 3/1940 | Reis | |
| 2,488,729 A | 11/1949 | Kooyman | |
| 3,246,187 A | 4/1966 | Iemura | |
| 3,299,335 A | 1/1967 | Wessels | |
| 3,444,406 A | 5/1969 | Aha | |
| 3,457,486 A | 7/1969 | Soeda | |
| 3,531,702 A | 9/1970 | Hill | |
| 3,604,960 A | 9/1971 | Krestel | |
| 3,787,014 A | 1/1974 | Story et al. | |
| 3,878,809 A | 4/1975 | Ray | |
| 3,909,647 A * | 9/1975 | Peterson | 310/156.12 |
| 4,004,202 A | 1/1977 | Davis | |
| 4,093,906 A | 6/1978 | Draxler | |

(Continued)

FOREIGN PATENT DOCUMENTS

EP 1050946 A2 * 11/2000

(Continued)

OTHER PUBLICATIONS

Notice of Allowance dated Oct. 28, 2010 in U.S. Appl. No. 12/102,539 which is the parent application of this application—7 pg.

Primary Examiner — Quyen Leung
Assistant Examiner — Alex W Mok
(74) Attorney, Agent, or Firm — Knobbe Martens Olson & Bear, LLP

(57) ABSTRACT

Some embodiments of the present disclosure provide a rotor of an electric brushless motor configured to be light weight and prevent vibrations generated during an operation of the motor to be transferred to the shaft of the rotor. The rotor includes a shaft elongated in a rotational axis, a single body magnet comprising alternately magnetized portions, and a vibration absorption portion interposed between the shaft and single body magnet. The vibration absorption portion absorbs vibrations generated during the operation of the motor and can include an elastic or a non-elastic material. The rotor further includes a non-elastic portion inhibiting the expansion of the vibration absorption portion when the vibration portion is elastic.

25 Claims, 13 Drawing Sheets

U.S. PATENT DOCUMENTS

| | | | | |
|---|---|---|---|---|
| 4,271,385 | A | 6/1981 | Azusawa | |
| 4,384,224 | A | 5/1983 | Spitler et al. | |
| 4,389,606 | A | 6/1983 | Detering | |
| 4,544,856 | A | 10/1985 | King | |
| 4,587,450 | A * | 5/1986 | Ozaki | 310/156.11 |
| 4,642,885 | A | 2/1987 | King | |
| 4,668,898 | A | 5/1987 | Harms et al. | |
| 4,712,030 | A | 12/1987 | Lakin et al. | |
| 4,745,318 | A * | 5/1988 | Ivanics | 310/114 |
| 4,774,448 | A | 9/1988 | Yoshitomi | |
| 4,874,975 | A | 10/1989 | Hertrich | |
| 4,888,530 | A | 12/1989 | Radik et al. | |
| 4,954,736 | A * | 9/1990 | Kawamoto et al. | 310/156.21 |
| 5,200,662 | A | 4/1993 | Tagami et al. | |
| 5,223,761 | A | 6/1993 | Larsen | |
| 5,237,737 | A | 8/1993 | Zigler et al. | |
| 5,243,732 | A | 9/1993 | Koharagi et al. | |
| 5,345,130 | A | 9/1994 | Kliman et al. | |
| 5,492,273 | A | 2/1996 | Shah | |
| 5,500,994 | A * | 3/1996 | Itaya | 29/598 |
| 5,528,095 | A * | 6/1996 | Strobl | 310/156.12 |
| 5,559,407 | A | 9/1996 | Dudley et al. | |
| 5,663,616 | A | 9/1997 | Stringfellow et al. | |
| 5,680,021 | A | 10/1997 | Hollenbeck | |
| 5,739,614 | A | 4/1998 | Suzuki et al. | |
| 5,767,635 | A | 6/1998 | Steffens et al. | |
| 5,801,463 | A | 9/1998 | Suzuki et al. | |
| 5,818,194 | A | 10/1998 | Nordby | |
| 5,929,589 | A | 7/1999 | Suzuki et al. | |
| 6,005,320 | A * | 12/1999 | Kim et al. | 310/156.36 |
| 6,034,455 | A * | 3/2000 | Goltz et al. | 310/90 |
| 6,081,013 | A | 6/2000 | Woodward et al. | |
| 6,209,622 | B1 | 4/2001 | Lagace et al. | |
| 6,310,452 | B1 | 10/2001 | Deck et al. | |
| 6,329,736 | B1 | 12/2001 | Bernauer et al. | |
| 6,351,091 | B1 | 2/2002 | Heinkel et al. | |
| 6,369,536 | B2 | 4/2002 | Beifus et al. | |
| 6,376,954 | B1 * | 4/2002 | Nunes, Jr. | 310/91 |
| 6,404,086 | B1 * | 6/2002 | Fukasaku et al. | 310/89 |
| 6,441,521 | B1 * | 8/2002 | Dombrovski et al. | 310/156.01 |
| 6,462,440 | B1 | 10/2002 | Asao et al. | |
| 6,603,231 | B2 * | 8/2003 | Dombrovski et al. | 310/156.01 |
| RE38,406 | E | 1/2004 | Faris et al. | |
| 6,700,297 | B2 * | 3/2004 | Hsu et al. | 310/266 |
| 6,718,617 | B2 | 4/2004 | Drexlmaier | |
| 6,765,319 | B1 * | 7/2004 | Thompson | 310/43 |
| 6,791,222 | B1 * | 9/2004 | Maslov et al. | 310/156.38 |
| 6,801,013 | B2 | 10/2004 | Woodward et al. | |
| 6,864,657 | B1 | 3/2005 | Lungu | |
| 6,891,306 | B1 * | 5/2005 | Soghomonian et al. | 310/216.092 |
| 6,924,611 | B1 | 8/2005 | Tzeng et al. | |
| 6,952,088 | B2 | 10/2005 | Woodward et al. | |
| 7,015,663 | B1 | 3/2006 | Tzeng et al. | |
| 7,042,180 | B2 | 5/2006 | Terry et al. | |
| 7,075,203 | B2 * | 7/2006 | Kuwert | 310/156.13 |
| 7,131,398 | B2 | 11/2006 | Cohen et al. | |
| 7,148,598 | B2 | 12/2006 | Ionel et al. | |
| 7,268,505 | B2 | 9/2007 | Pant et al. | |
| 7,272,302 | B2 | 9/2007 | Woodward et al. | |
| 7,296,753 | B1 | 11/2007 | Zucker | |
| 7,327,118 | B2 | 2/2008 | Pant et al. | |
| 7,378,821 | B2 | 5/2008 | Simpson, III | |
| 7,443,119 | B2 | 10/2008 | Liu | |
| 7,458,228 | B2 | 12/2008 | Lagace et al. | |
| 7,590,334 | B2 | 9/2009 | Yabusaki et al. | |
| 8,004,141 | B2 | 8/2011 | Jeung | |
| 8,033,007 | B2 | 10/2011 | Jeung | |
| 2001/0048261 | A1 * | 12/2001 | Kojima et al. | 310/156.13 |
| 2002/0047348 | A1 | 4/2002 | Ohiwa et al. | |
| 2002/0121837 | A1 * | 9/2002 | Dombrovski et al. | 310/261 |
| 2002/0158535 | A1 * | 10/2002 | Maul | 310/156.08 |
| 2003/0001442 | A1 | 1/2003 | Hsu | |
| 2003/0080772 | A1 | 5/2003 | Giacomini et al. | |
| 2003/0173924 | A1 | 9/2003 | Blase et al. | |
| 2004/0095035 | A1 | 5/2004 | Sogabe et al. | |
| 2004/0195924 | A1 * | 10/2004 | Kuwert | 310/156.13 |
| 2004/0232871 | A1 | 11/2004 | Deck et al. | |
| 2005/0001502 | A1 * | 1/2005 | Yamazaki et al. | 310/156.47 |
| 2005/0029976 | A1 | 2/2005 | Terry et al. | |
| 2005/0116392 | A1 * | 6/2005 | Vesci et al. | 264/611 |
| 2005/0162108 | A1 | 7/2005 | Pant et al. | |
| 2005/0194918 | A1 | 9/2005 | Takeuchi | |
| 2005/0253744 | A1 | 11/2005 | Kern | |
| 2006/0113856 | A1 * | 6/2006 | Tanno et al. | 310/156.37 |
| 2006/0113857 | A1 * | 6/2006 | Honkura et al. | 310/156.43 |
| 2006/0186751 | A1 * | 8/2006 | Kim et al. | 310/156.44 |
| 2006/0244333 | A1 | 11/2006 | Jeung | |
| 2006/0291820 | A1 | 12/2006 | Kobayashi | |
| 2007/0024250 | A1 | 2/2007 | Simpson, III | |
| 2007/0046124 | A1 * | 3/2007 | Aydin et al. | 310/156.37 |
| 2007/0247091 | A1 | 10/2007 | Maiocchi | |
| 2008/0084171 | A1 | 4/2008 | Leehey et al. | |
| 2008/0313884 | A1 | 12/2008 | Jeung | |
| 2008/0315691 | A1 | 12/2008 | Jeung | |
| 2009/0039807 | A1 | 2/2009 | Yabusaki et al. | |
| 2009/0039820 | A1 | 2/2009 | Milano et al. | |
| 2009/0058202 | A1 | 3/2009 | Jeung | |
| 2009/0102305 | A1 * | 4/2009 | Lu | 310/156.49 |
| 2009/0108686 | A1 | 4/2009 | Jeung | |
| 2009/0267549 | A1 | 10/2009 | Kitagawa | |
| 2009/0284201 | A1 | 11/2009 | Jeung | |
| 2010/0225257 | A1 | 9/2010 | Masfaraud et al. | |

FOREIGN PATENT DOCUMENTS

| | | | |
|---|---|---|---|
| FR | 2896638 | A | 7/2007 |
| GB | 2015266 | A * | 9/1979 |
| JP | 54001810 | | 1/1979 |
| JP | 55071162 | | 5/1980 |
| JP | 56117567 | A * | 9/1981 |
| JP | 56157249 | A * | 12/1981 |
| JP | 58112449 | A * | 7/1983 |
| JP | 58119754 | | 7/1983 |
| JP | 01-129741 | A | 5/1989 |
| JP | 01129741 | A * | 5/1989 |
| JP | 05300770 | A * | 11/1993 |
| JP | 06086485 | A * | 3/1994 |
| JP | 2001268831 | A * | 9/2001 |
| JP | 03248248 | B2 | 1/2002 |
| JP | 2004-023823 | A | 1/2004 |
| JP | 2004-56887 | A | 2/2004 |
| JP | 2004-304928 | A | 10/2004 |
| JP | 2005-168241 | | 6/2005 |
| KR | 10-2006-0115930 | A | 11/2006 |
| KR | 10-0696854 | B1 | 3/2007 |
| KR | 10-2008-0019807 | | 3/2008 |
| KR | 10-2008-0099988 | | 11/2008 |
| KR | 10-2009-0041899 | | 4/2009 |
| WO | WO 2007000114 | A1 * | 1/2007 |
| WO | 2009/140419 | A2 | 11/2009 |

* cited by examiner

ROTOR OF BRUSHLESS MOTOR

CROSS-REFERENCE TO RELATED APPLICATIONS

This application is a continuation in part application of U.S. application Ser. No. 11/896,454, filed on Aug. 31, 2007 and U.S. application Ser. No. 12/102,539, filed on Apr. 14, 2008. This application further claims priority to and the benefit of Korean Patent Application No. 10-2007-0045977, filed on May 11, 2007 in the Korean Intellectual Property Office. This application further claims priority to and the benefit of Korean Patent Application No. 10-2007-0107665, filed on Oct. 25, 2007 in the Korean Intellectual Property Office. The disclosures of U.S. application Ser. No. 11/896,454, U.S. application Ser. No. 12/102,539, Korean Patent Application No. 10-2007-0045977, and Korean Patent Application No. 10-2007-0107665 are incorporated herein by reference in its entirety.

BACKGROUND

1. Field

The present disclosure relates to an electric motor.

2. Description of the related technology

Generally a rotor of an electric brushless motor uses a permanent magnet and a rotor core of a ferromagnetic bulk or an electric steel sheet in order to form a magnetic circuit. However, when the permanent magnet rotor generates a rotation torque due to its interactions with an alternating magnetic field of a stator, there are vibrations generated in air gaps between the rotor and the stator. These vibrations can amplify to noise and/or be transferred to the load of the motor to cause damage or inefficiencies. Also, the weight of the ferromagnetic bulk or electric steel used as rotor core increases the weight of the motor and reduces efficiency in the application of the motor.

SUMMARY

These and other problems are solved by a rotor of an electric brushless motor configured to be light weight and reduce vibrations during the operation of the motor. One embodiment of the rotor includes a shaft elongated in a rotational axis, one or more body magnets comprising alternately magnetized portions, and a vibration absorption portion interposed between the shaft and one or more body magnets.

The body magnets can include a ring magnet surrounding at least a portion of the shaft, wherein the ring magnet includes two or more annular magnet portions arranged along the axis and includes a plurality of poles extending generally parallel to each other. In other embodiment, the body magnets include a C shaped cross-section taken in a plane perpendicular to the axis. In one embodiment, the body magnets include toroid shaped magnets. In another embodiment, the one more body magnets form a partial loop, wherein the rotor further includes one or more additional body magnets, each additional body permanent magnet including alternately magnetized portions. The one or more body magnets are arranged so as to surround at least a portion of the shaft and they are arranged along the axis.

In one embodiment, the vibration absorption portion includes an annular body and can surround the shaft. In other embodiment, the vibration absorption portion may not be annular while being interposed between the shaft and the single body magnet. The vibration absorption portion can engage with the shaft. The portion further includes an engagement enhancing layer fixed to a circumference of the shaft, wherein the vibration absorption portion is engaged with the shaft via the engagement enhancing layer.

In one embodiment the vibration absorption portion includes an elastic material. This embodiment further optionally includes a non-elastic portion interposed between the body magnet and the vibration absorption portion, wherein the non-elastic portion does not include an elastic material. The non-elastic portion can be annular and surrounding the vibration absorption portion. In other embodiments, the non-elastic portion may not be annular while being interposed between the single body magnet and the vibration absorption portion. Also the non-elastic portion can include a ferromagnetic material or a non-ferromagnetic material.

In one embodiment the rotor can further include a non-elastic portion interposed between the body magnet and the vibration absorption portion, wherein the non-elastic portion is substantially non-elastic and configured to minimize transferring of a force of radial expansion of the vibration absorption portion to the body magnet while the rotor is rotating. The non-elastic portion can be engaged with the body magnet, wherein the non-elastic portion includes at least one of protrusion and recess on an outer circumference, wherein the body magnet includes at least one counterpart configuration configured to engage with the at least one of protrusion and recess.

In another embodiment when the vibration absorption portion includes an elastic material, the rotor further includes a non-elastic portion interposed between the body magnet and the vibration absorption portion, wherein the non-elastic portion includes one or more annular layers. The non-elastic portion can be engaged with the vibration absorption portion, wherein the non-elastic portion includes at least one of protrusion and recess on an inner circumference, wherein the vibration absorption portion includes at least one counterpart configuration configured to engage with the at least one of protrusion and recess.

In an embodiment of the rotor, the vibration absorption portion is substantially free of an elastic material. The vibration absorption portion can include a pored structure, wherein the pored structure includes a plurality of networked walls defining pores.

BRIEF DESCRIPTION OF THE DRAWINGS

The above and/or other aspects and advantages of the present disclosure will become apparent and more readily appreciated from the following detailed description, taken in conjunction with the accompanying drawings of which.

DETAILED DESCRIPTION OF THE DRAWINGS

A rotor of an electric motor in described method of making the electric motor includes providing a rotor of the disclosure and a stator including a plurality of magnetic poles and assembling the rotor and the stator such that the rotor is to rotate relative to the plurality of the stator poles.

The rotor includes a ring magnet completing magnetic circuits with a stator of the motor to operate the brushless motor. The rotor can be light weight and thus improve the motor's power to weight ratio. The rotor includes a vibration absorption portion comprising a vibration absorbing material. The vibration absorption portion of the rotor is configured to absorb the vibration caused by an unbalance in magnetic flux densities of gaps in the motor and magnetic vibration caused by pole shift of a stator in the motor. The vibration absorption portion of the rotor is configured to reduce the vibration from being delivered to a shaft of the rotor and subsequently to a load of the motor. The rotor further includes a non-elastic portion between the single body magnet and the vibration absorption portion to inhibit the thermal expansion of the vibration absorption portion that can cause damage to the single body magnet.

Figure 1:
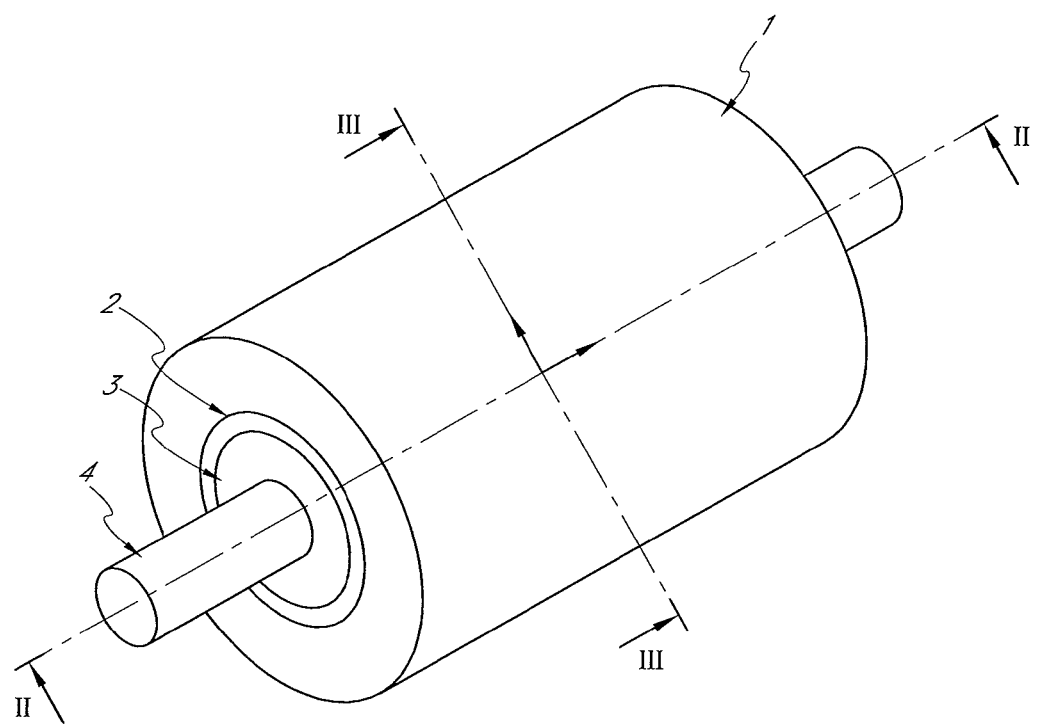
FIG. 1 is a perspective view of the rotor of a brushless motor according to an embodiment of the disclosure.
Figure 2:
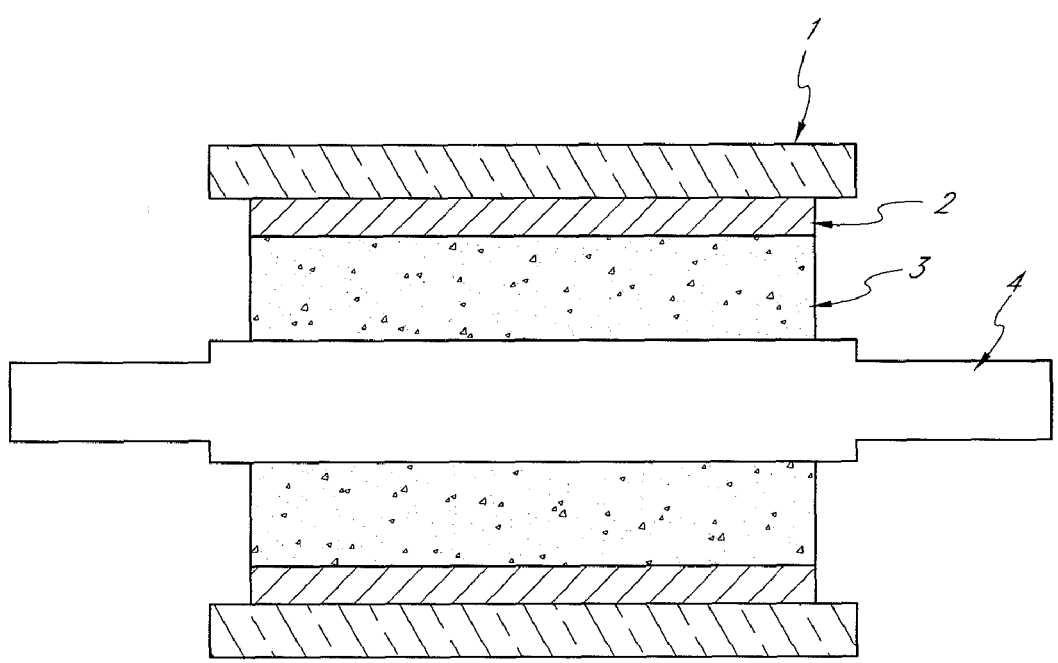
FIG. 2 is a cross-sectional view of the rotor of FIG. 1 in a plane passing through the II axis.

FIG. 1 and FIG. 2 illustrate the rotor of a brushless motor. FIG. 1 as shown is a perspective view of the rotor. In the embodiment as shown in FIG. 1, the rotor includes a body magnet 1, a non-elastic portion 2, a vibration absorption portion 3, and a shaft 4. Two axes are illustrated in FIG. 1 for defining orientation of cross-sections to follow. Axis II is an axis coinciding with the rotational axis of the shaft 4. Axis III is an axis perpendicular to axis II that lies in the midpoint of the rotor in the longitudinal direction.

FIG. 2 is a cross-section of the rotor in a plane passing through the axis II. In the illustrated embodiment, the shaft 4 is surrounded by the vibration absorption portion 3. Subsequently, the vibration absorption portion 3 is surrounded by the non-elastic portion 2 and finally the non-elastic portion 2 is surrounded by single body magnet 1.

Figure 3:
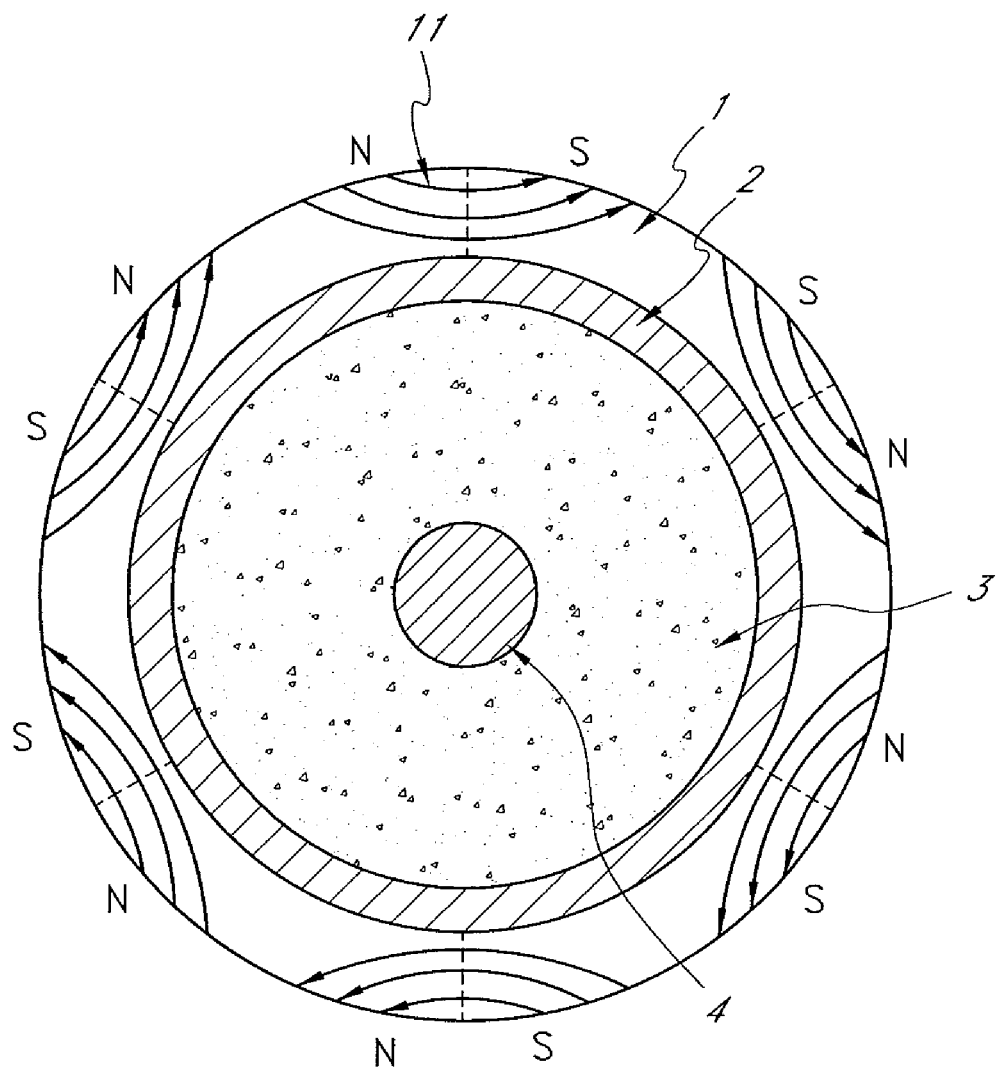
FIG. 3 is a cross-sectional view of the rotor of FIG. 1 in a plane passing through the III axis.
Figure 4:
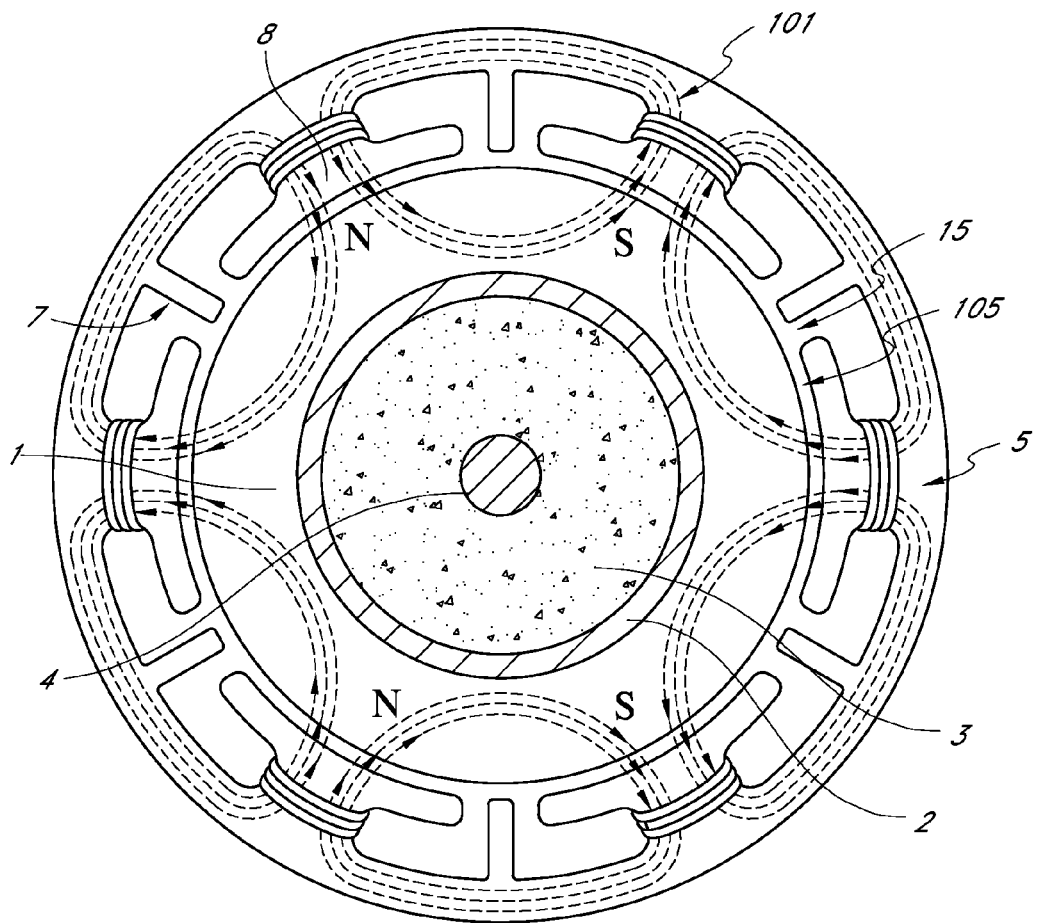
FIG. 4 illustrates a magnetic circuit of the rotor and a stator of the motor according to an embodiment of the disclosure.

FIG. 3 and FIG. 4 illustrate the magnetic circuit forming in the body magnet during the operation of the brushless motor. FIG. 3 is a cross-section of the rotor in the plane passing through the axis III in FIG. 1. Magnetic flux fields 11 are formed inside the body magnet 1 with the electromagnets of the stator. There is a plurality of poles formed on the body magnet, where the poles are extending generally parallel to each other as shown.

FIG. 4 is a cross-section showing the complete magnetic circuit between the rotor and the stator 5 of the motor comprising at least two electric magnets are shown together in the plane passing through axis III of the rotor of FIG. 1. The magnetic field loop 101 is formed within the stator 5 and the body magnet 1 of the rotor during the operation of the motor. The single body magnet 1 allows the magnetic field loop 101 to be formed without an addition of the substantially heavy ferromagnetic core. During the operation of the motor, there are vibrations caused by unbalance among magnetic flux densities of slots 15 in the stator and the gaps 105 between the stator and the rotor. There are also magnetizing vibration caused by pole shifts of the stator. When these vibrations are transferred to the shaft of the rotor and consequently to the load, the vibration can amplify to noise and can further amplify into resonance noise. This can increase the stress on the bearings of the motor and reduce the operational life time of the motor. The vibration absorbing portion absorbs these vibrations and minimizes the vibrations from being transferred to the shaft. The stator 5 also comprises extra poles 7 that reduce cogging caused by bridge fields generated between wound poles 8. Also the extra poles 7 reduce the number of main poles 8 wound with coil and make the stator lighter.

Figure 8:
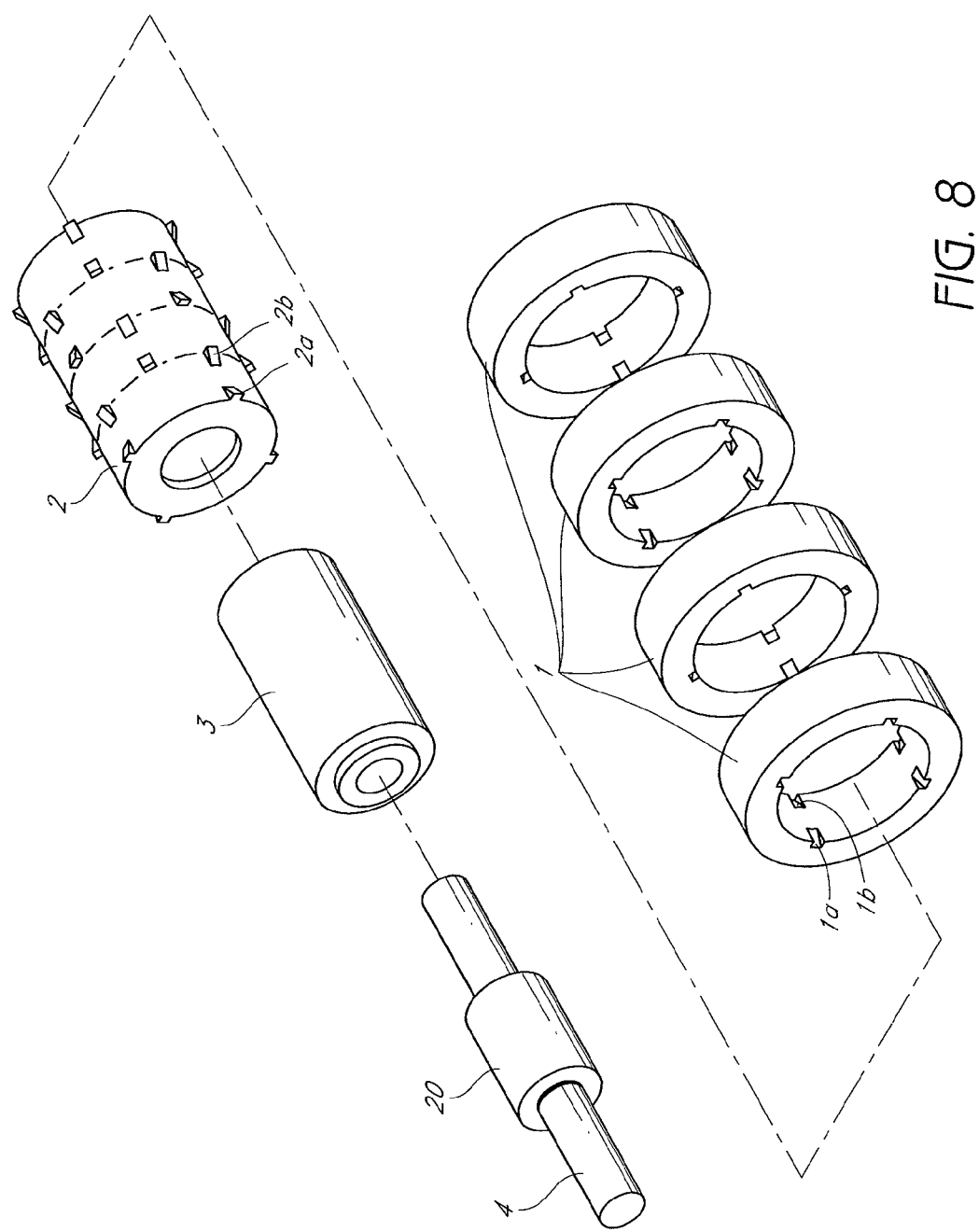
FIG. 8 is an exploded perspective view showing the assembly of the rotor of FIG. 7.
Figure 9:
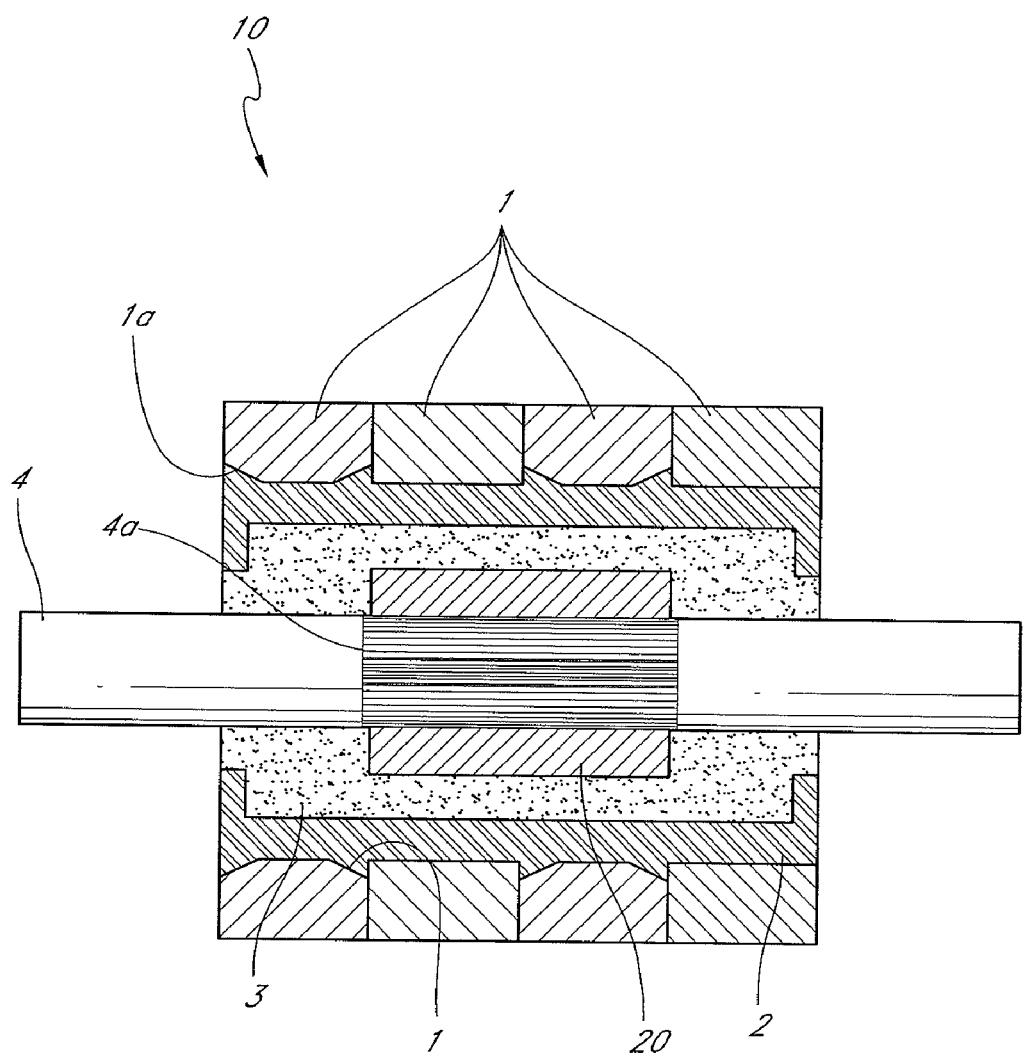
FIG. 9 is a cross-sectional view showing the assembly of the rotor of FIG. 7.
Figure 10:
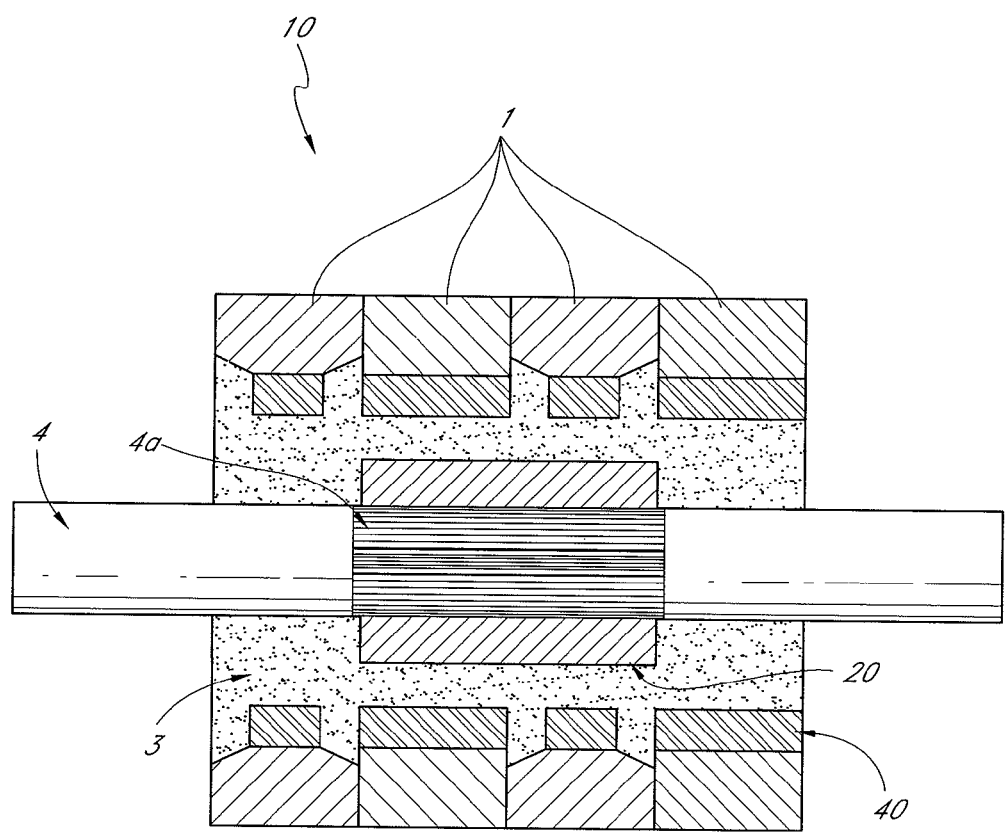
FIG. 10 is a cross-sectional view showing the assembly of the rotor in another embodiment.

In the illustrated embodiment of the assembled rotor 10 as shown in FIG. 7 through FIG. 10, the shaft 4 is a solid rod. In other embodiments the shaft can be a hollow tube. The cross-section can be circular or other shapes. The shaft is configured to rotate along a pivot and consequently drive the rotor 10 to rotate. In one illustrated embodiment as shown in FIG. 10 the roughened surface 4a is provided on the surface of the shaft 4 so as to promote better adhesion of additional layers that can form around the shaft. In one of the embodiments a plastic engagement enhancing layer 20 can be injection molded around the roughened surface 4a of the shaft 4 configured to provide better adhesion of additional portions to be formed. The shaft 4 includes a high strength and durable material. Examples include material such as metal, high strength plastic, etc.

In the illustrated embodiment as shown in FIGS. 7 through 10, vibration absorption portion 3 includes an annular body and is interposed between the shaft 4 and the single body magnet 1. The vibration absorption portion 3 contacts and is engaged with the shaft 4. In some embodiments the vibration absorption portion 3 is integrated with the shaft 4 via the engagement enhancing layer 20 fixed to the circumference of the shaft 4 so as to form the vibration absorption 3 portion around the shaft 4. In another embodiment the vibration absorption portion 3 includes one more annular layers of identical or different material. In other embodiments the vibration absorption portion 3 is not annular while being interposed between the shaft 4 and the single body magnet 1.

The vibration absorption portion 3 includes light weight, noise and vibration absorbing material. In one of the embodiments the vibration absorption portion includes an elastic material. The examples include rubber, resin such as silicon, etc. The resin is injection molded to form the vibration absorption portion 3. When the vibration absorption portion 3 includes an elastic material, a non-elastic portion 2 is provided outside the vibration absorption portion 3, wherein the non-elastic portion 2 does not includes an elastic material, wherein the single body magnet 1 is subsequently engages with the non-elastic portion 2.

Figure 5:
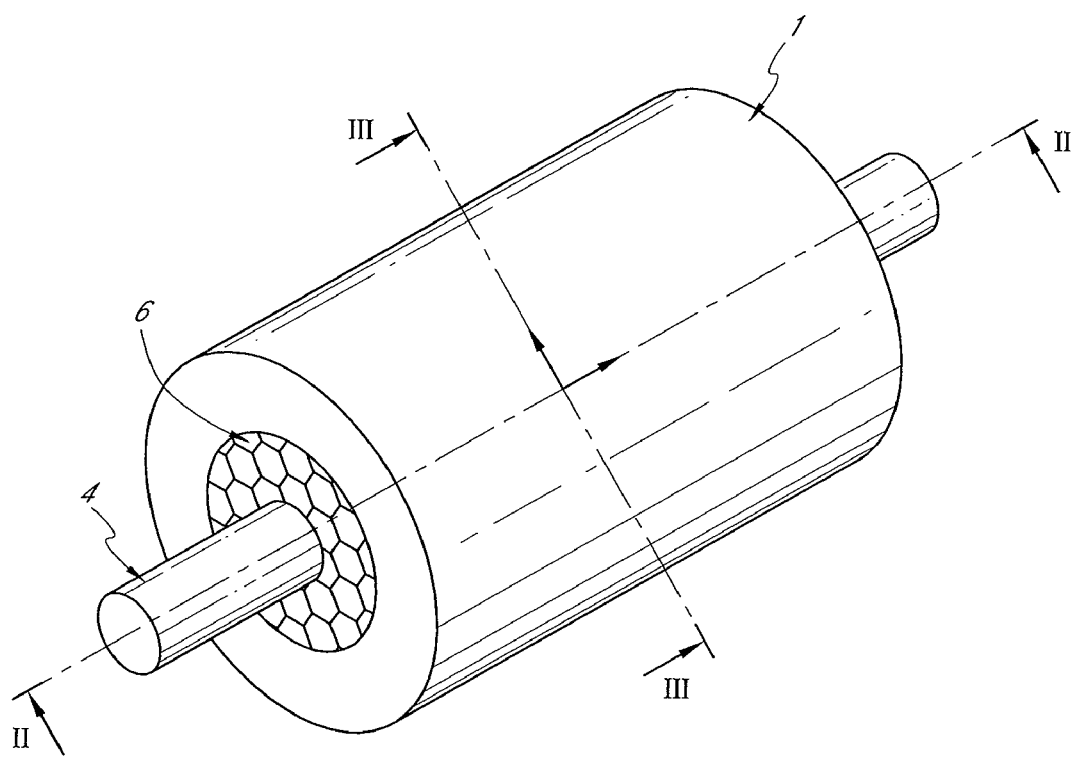
FIG. 5 is a perspective view of the rotor of a brushless motor according to another embodiment of the disclosure.
Figure 6:
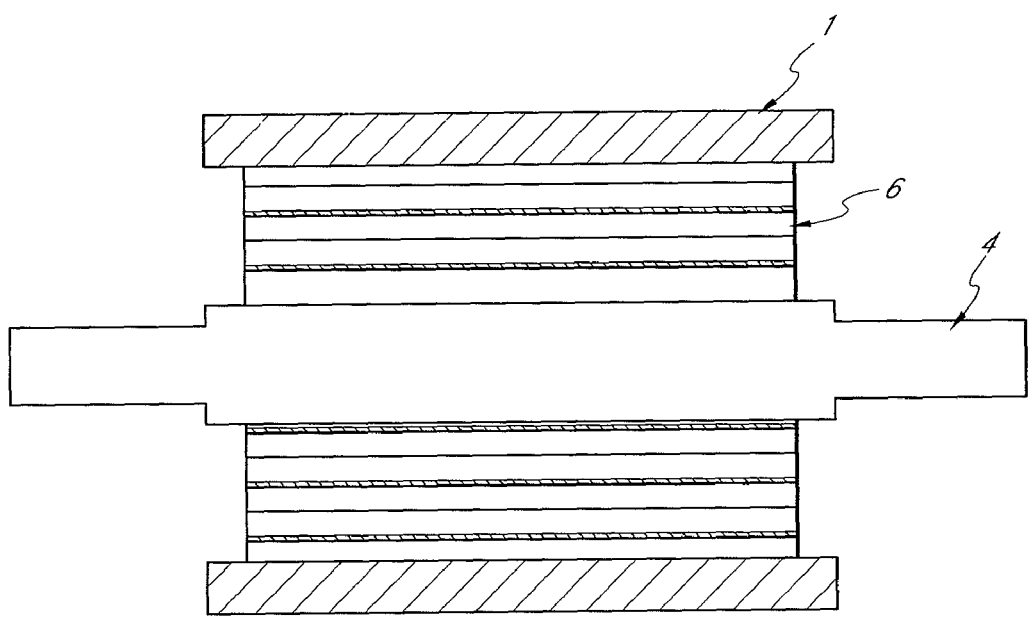
FIG. 6 is a cross-sectional view of the rotor of FIG. 5

In another embodiment shown in FIGS. 5 and 6, the vibration absorption portion includes a pored structure 6, wherein providing the vibration absorption portion outside the shaft includes engaging the pored structure with the shaft 4 with or without an engagement enhancing layer 20 between the shaft 4 and vibration absorption portion. The porous structure 6 includes a plurality of networked walls defining pores. The examples of the material include honeycombed or corrugated paper, wood, ceramic, plastic, etc. This portion can be fixed to the shaft 4 by via adhesives. When the vibration absorbing portion 6 includes material substantially free of being elastic as mentioned, the foregoing non-elastic portion can be omitted from the configuration of the rotor 10.

In the illustrated embodiments as shown in FIGS. 7 through 10, the rotor 10 includes non-elastic portion 2 interposed between the single body magnet 1 and the vibration absorption portion 3, wherein the non-elastic portion does not include an elastic material. The non-elastic portion 2 is substantially non-elastic and configured to minimize transferring of a force of radial expansion of the vibration absorption portion 3 to the single body magnet 1 while the rotor 10 is rotating. The non-elastic portion 2 can include one or more annular layers. In one embodiment the non-elastic portion 2 can be annular and surrounding the vibration absorption portion 3. The non-elastic portion 2 can include a cylindrical portion, wherein providing the non-elastic portion outside the vibration absorption portion 3 includes arranging the non-elastic portion 2 and the shaft 4 such that the non-elastic portion and the shaft define a space therebetween and elastic material is injected into the space to form the vibration absorption portion 3. In other embodiment the non-elastic portion 2 is not annular while being interposed between the single body magnet 1 and the vibration absorption portion 3.

The non-elastic portion 2 is engaged with the vibration absorption portion 3. The non-elastic portion 2 includes at least one of protrusion and recess on an inner circumference, wherein the vibration absorption portion 3 includes at least on counterpart configuration configured to engage with at least one of protrusion and recess. The non-elastic portion 2 is configured to be engaged with the single body magnet 1 as well. The non-elastic portion 2 includes at least one of protrusion 2a and 2b on the outer circumference, wherein the single body magnet 1 includes at least one counterpart configuration, indentations 1a and 1b, configured to engage with the at least on protrusion 2a and 2b.

Some embodiments include a ferromagnetic material for the non-elastic portion 2. Other embodiments do not include a ferromagnetic material. Characteristics of the material used are relatively high strength, relatively heat resistant, and having relatively low thermal expansion coefficient. The non-elastic portion 2 comprising low thermal expansion coefficient material is configured to inhibit the expansion of itself and the expansion of the vibration absorption portion 3 during an operation of motor. The expansion of the two portions can occur due to thermal expansion of the materials due to heat produced during operation of the motor. Some examples used for non-elastic portion 2 include a plastic material and/or a metal such as aluminum, steel, and etc.

Figure 7:
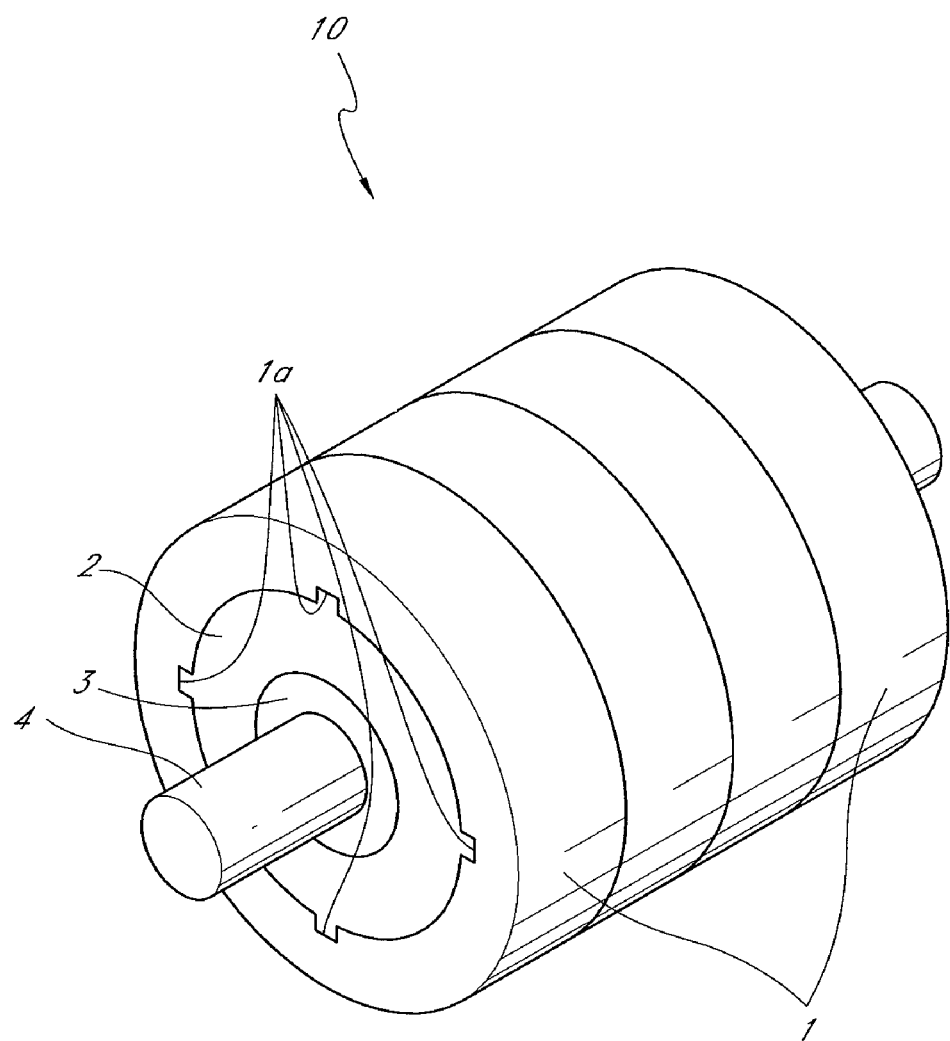
FIG. 7 is a perspective view showing an assembled model of the rotor of a brushless motor according to an embodiment of the disclosure.

In the illustrated embodiment as shown in FIGS. 7 through 9, when the non-elastic portion 2 includes a plastic material the plastic is injection molded over the vibration absorbing portion 3. This portion includes protrusions 2a and 2b to correspond to the indentations 1a and 1b in the body magnet 1. The protrusions 2a and 2b are configured to engage in the indentations 1a and 1b of the body magnet 1 to securely fix the magnet onto the non-elastic portion 2.

In one embodiment the non-elastic portion 2 includes of aluminum. The portion can be glued on the surface of the vibration absorption portion 3. In the illustrated embodiment as shown in FIG. 10 the aluminum portion 40 can have through holes corresponding to the indentations 1a and 1b of the outer single body magnet 1. And the non-elastic aluminum portion 40 can be injection molded together with the inner vibration absorption portion 3 and the melted resin of the vibration absorption portion 3 fills the through holes in the aluminum portion 40 and protrude outwardly and forms protrusions outside the non-elastic portion (aluminum) corresponding to the indentations 1a and 1b of the body magnet 1.

In the illustrated embodiment as shown in FIGS. 7 through 10, the body magnet 1 includes polar anisotropic magnet. The magnet is configured to be thick enough to complete the magnetic field 101 without a ferromagnetic core inside the magnet. In one embodiment the body magnet is a single body annular magnet. In other embodiments body magnet includes two or more annular magnet portions with the length from about 25 mm to about 30 mm aligned together. There can be indentations 1a and 1b formed on the inner surface of the single body magnet that are aligned with the protrusions 2a and 2b on the outer circumference of non-elastic portion 2. The alignment of the indentations 1a and 1b of the single body magnet 1 and the protrusions 2a and 2b of the non-elastic portion 2 is configured to fix the single body magnet 1 on the non-elastic portion 2. When the vibration absorption portion 6 (in FIG. 5) substantially free of an elastic material is used for the vibration absorption portion and, thus, the on-elastic portion 2 is absent, the body magnet 1 can be fixed on vibration absorption portion 6 with adhesives.

Figure 11A:
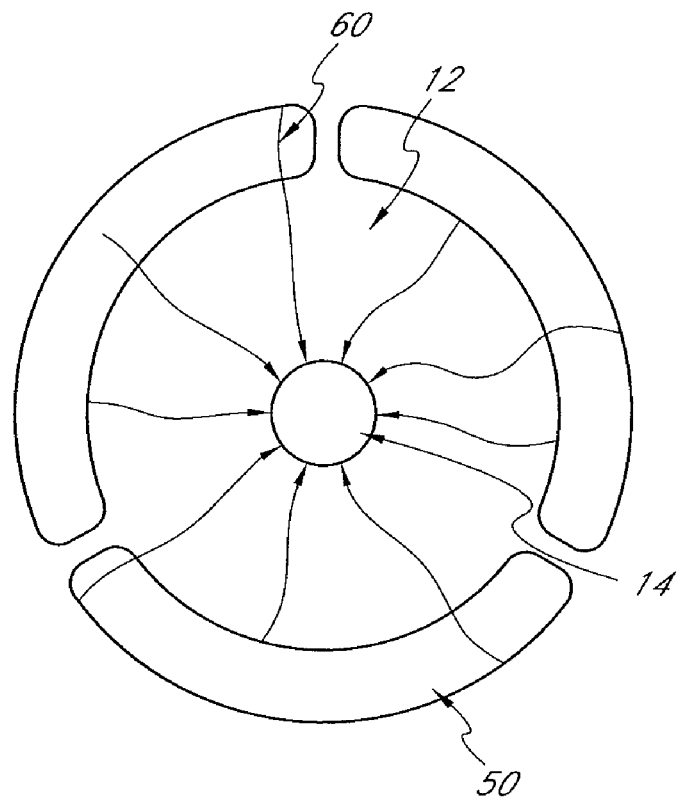
FIGS. 11A through 11C are illustrations showing comparison of vibration absorption between conventional techniques and an embodiment of the embodiment.
Figure 11A:
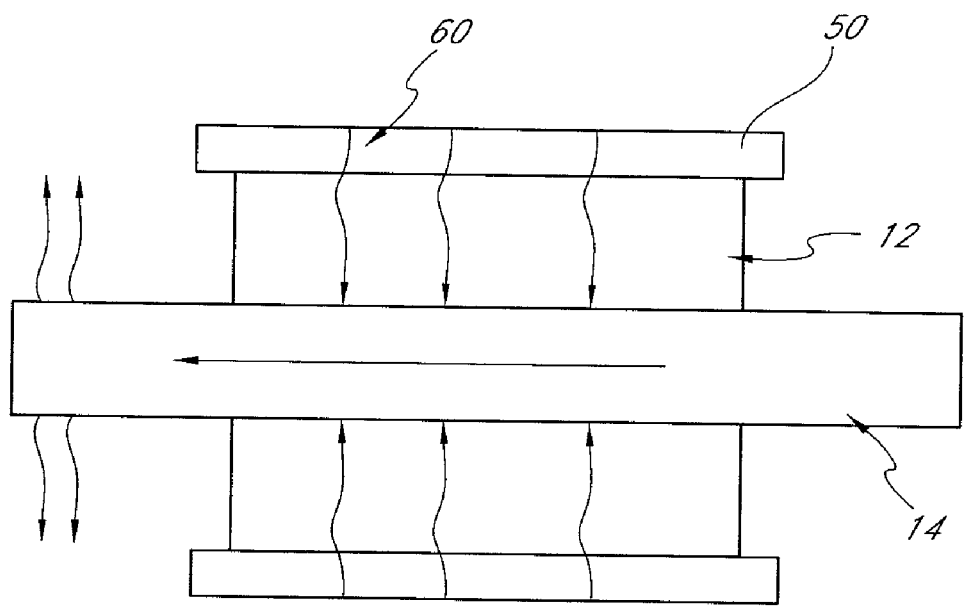
Figure 11B:
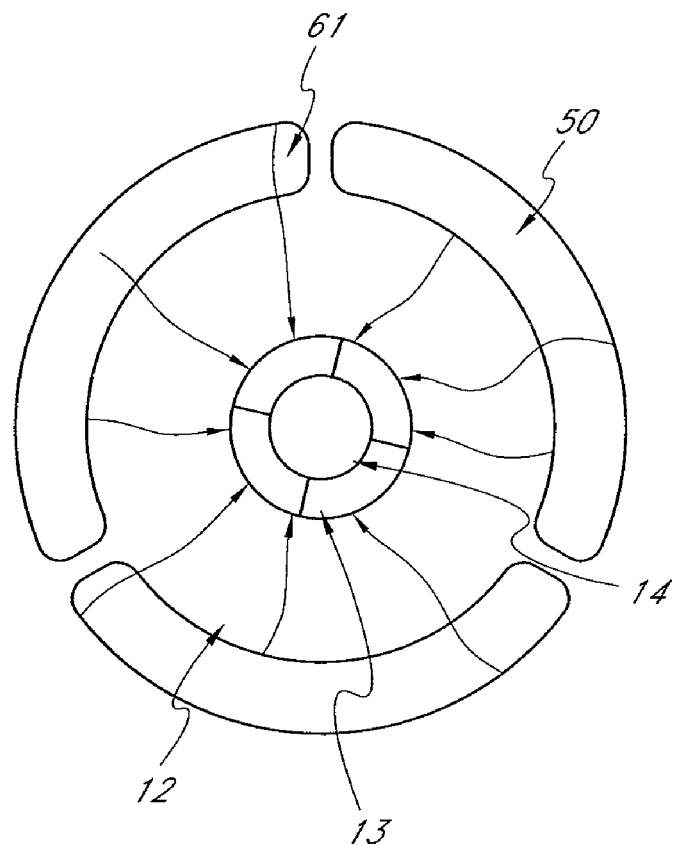
Figure 11B:
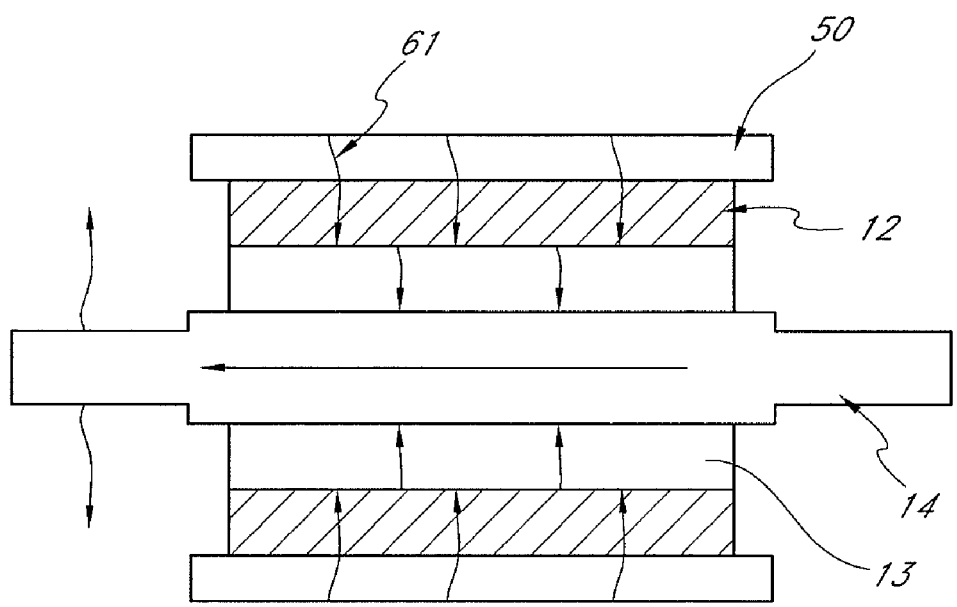
Figure 11C:
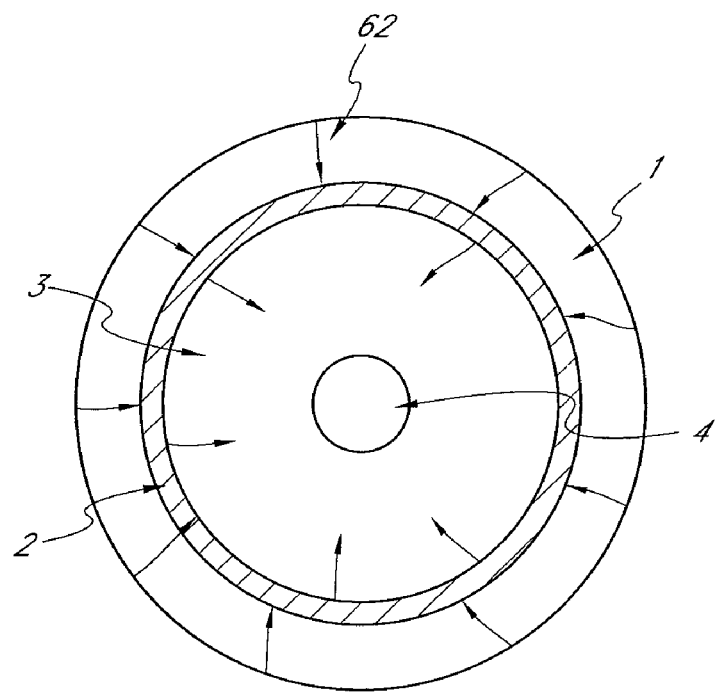
Figure 11C:
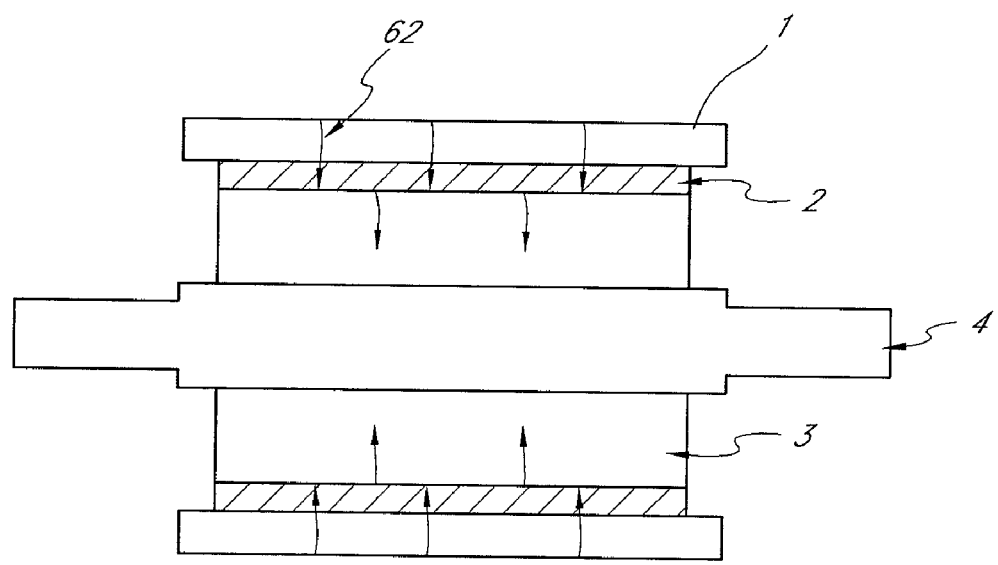

FIGS. 11A through 11C illustrate the simulated drawings for vibration being transferred to the shaft 4. As shown in FIG. 11A, vibrations 60 during the operation of an electric motor travel through magnet body 50 and ferromagnetic core 12 and finally transferred to a shaft 14. FIG. 11b illustrates an example where a rubber or a vibration absorbing part 13 is interposed between a ferromagnetic core 12 and a shaft 14. There are less vibrations being transferred to the shaft 14 as vibrations 61 are absorbed in some degree by the vibration absorbing part 13. However, the vibration absorbing part 13 is not thick enough to reduce the vibrations as ferromagnetic core 12 needs to include enough thickness to complete magnetic circuits with the stator of an electric motor. FIG. 11C illustrates an embodiment of the present disclosure. The vibration absorption portion 3 reduces vibrations 62 generated from the gaps between the rotor and a stator of the motor. The shaft 4 is substantially free of these vibrations 62.

While this disclosure has been particularly shown and described with reference to exemplary embodiments thereof, it will be understood by those skilled in the art that various changes in form and details can be made therein without departing from the spirit and scope of the disclosure as defined by the appended claims.

What is claimed is:

1. A rotor of a brushless motor, comprising:
   a shaft elongated in a rotational axis;
   a magnet layer comprising two or more magnetic rings arranged along the rotational axis and surrounding a portion of the shaft, the two or more magnetic rings in combination providing a plurality of permanent magnet poles in the magnet layer;
   a vibration absorption portion interposed between the shaft and the magnet layer; and
   a molded, non-ferromagnetic single piece member interposed between the vibration absorption portion and the two or more magnetic rings, wherein each of the two or more magnetic rings contacts and is engaged with the single piece member, wherein the molded, non-ferromagnetic single piece member is substantially less elastic and substantially less thermally expansive than the vibration absorption portion.

2. The rotor of claim 1, wherein the plurality of permanent magnet poles extend generally parallel to each other.

3. The rotor of claim 1, wherein the vibration absorption portion comprises an annular body and is surrounding the shaft.

4. The rotor of claim 3, wherein the vibration absorption portion contacts and is engaged with the shaft.

5. The rotor of claim 3, further comprising an engagement enhancing layer fixed to a circumference of the shaft, wherein the vibration absorption portion is integrated with the shaft via the engagement enhancing layer.

6. The rotor of claim 5, wherein the vibration absorption portion comprises a first portion, a second portion and a third portion arranged in order along the shaft, wherein the second portion is integrated with the shaft via the engagement enhancing layer, wherein the first portion is integrated with the shaft without an intervening layer between the first portion and the shaft, wherein the third portion is integrated with the shaft without an intervening layer between the first portion and the shaft.

7. The rotor of claim 1, wherein the vibration absorption portion comprises an elastic material.

8. The rotor of claim 1, wherein the single piece member does not comprise an elastic material.

9. The rotor of claim 1, wherein the single piece member is annular and surrounding the vibration absorption portion.

10. The rotor of claim 1, wherein the rotor does not comprise a ferromagnetic core between the magnet layer and the shaft.

11. The rotor of claim 1, wherein the single piece member is substantially non-elastic and configured to minimize transferring of a force of radial expansion of the vibration absorption portion to the magnet layer while the rotor is rotating.

12. The rotor of claim 1, wherein the single piece member comprises at least one of protrusion and recess on an outer circumference, wherein the magnet layer comprises at least one counterpart configuration configured to engage with the at least one of protrusion and recess.

13. The rotor of claim 1, wherein the single piece member contacts and is engaged with the vibration absorption portion.

14. The rotor of claim 13, wherein the single piece member comprises at least one of protrusion and recess on an inner circumference, wherein the vibration absorption portion comprises at least one counterpart configuration configured to engage with the at least one of protrusion and recess.

15. The rotor of claim 1, wherein the vibration absorption portion comprises a pored structure.

16. The rotor of claim 15, wherein the pored structure comprises a plurality of networked walls defining pores.

17. A brushless motor comprising:
   the rotor of claim 1; and
   a stator comprising at least two electric magnets.

18. The rotor of claim 1, wherein the vibration absorption portion comprises a surface contacting the shaft.

19. The rotor of claim 1, wherein the vibration absorption portion is located next to the shaft.

20. The rotor of claim 1, wherein the rotor does not comprise a ferromagnetic material between the vibration absorption portion and the shaft.

21. The rotor of claim 1, wherein there is no intervening member between the vibration absorption portion and the shaft.

22. The rotor of claim 1, wherein the vibration absorption portion contacts the shaft.

23. The rotor of claim 1, wherein the vibration absorption portion comprises an injection-molded single piece interposed between the shaft and the two or more magnetic rings.

24. The rotor of claim 1, wherein the molded, non-ferromagnetic single piece member comprises one of a key protrusion and key recess on an outer circumference, wherein the magnet layer comprises the other, wherein the key protrusion and the key recess are configured to form a key engagement between the magnet layer and the single piece member.

25. The rotor of claim 1, wherein molded, non-ferromagnetic single piece member comprises flanges disposed at both sides thereof and configured to block at least part of sides of the vibration absorption portion.

* * * * *